Inventor:
FRITZ G. R. Rockstuhl
By E. D. Frankel
Patent Agent

March 14, 1961  F. G. R. ROCKSTUHL  2,975,353
D.C.-D.C. CONVERTER
Filed Sept. 27, 1956  2 Sheets-Sheet 2

Inventor:
FRITZ G.R. Rockstuhl
By E. D. Frankel
Patent Agent

United States Patent Office 2,975,353
Patented Mar. 14, 1961

2,975,353

D.C.-D.C. CONVERTER

Fritz G. R. Rockstuhl, Neu-Ulm (Danube), Germany, assignor to Telefunken G.m.b.H., Berlin, Germany Filed Sept. 27, 1956, Ser. No. 612,549

Claims priority, application Germany Oct. 11, 1955

5 Claims. (Cl. 321—2)

The present invention relates to an apparatus for converting the low D.C. voltage of a battery, such as a secondary battery, or other voltage source, into a higher D.C. voltage, said apparatus having a maximum efficiency and a minimum weight. Such apparatus is desirable, for example, to supply anode current in portable radio transmission equipment.

It has been known to replace the conventional mechanical interrupters or vibrators with a transistor oscillator and, thereby, save the relatively high energizing power required by such mechanical interrupters, see British Patent No. 728,024. However, the transistor oscillator has, in the past, had the disadvantage of requiring a transformer which, in comparison with other circuit elements, is relatively massive, in order to obtain good efficiency, or if this transformer is made lighter, an unsatisfactory efficiency will result.

It is a primary object of the present invention to avoid the use of a transformer entirely.

It is another object of the invention to provide a D.C.-D.C. converter, having a transistor oscillator so connected that the alternating voltage supplied by the transistor oscillator controls other transistors which, in turn, act as switches, said transistors being inserted at the output between the battery and a multiplier circuit comprising rectifiers and condensers, whereby an alternating voltage is fed to the input of the multiplier. No transformer is used in such system. Thus, the battery energy does not pass through the transistor oscillator, i.e., it passes directly to the multiplier via the transistors acting as switches. The transistor oscillator serves only to control the switching transistors. As rectifiers, germanium dry rectifiers may be used which have an efficiency of 98%.

It is another object of the invention to obtain a total efficiency as high as possible by connecting a reactance coil in front of the multiplier, said reactance coil rendering the shape of the alternating voltage curve at the output of the switching transistors more nearly square. In this way, losses in the transistors are reduced.

The efficiency is also high in circuits using electron tubes requiring anode voltages and grid voltages of different values, because it is possible to take off the different required voltages from the various stages of the multiplier circuit, so that no losses in voltage divider resistances need be experienced.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
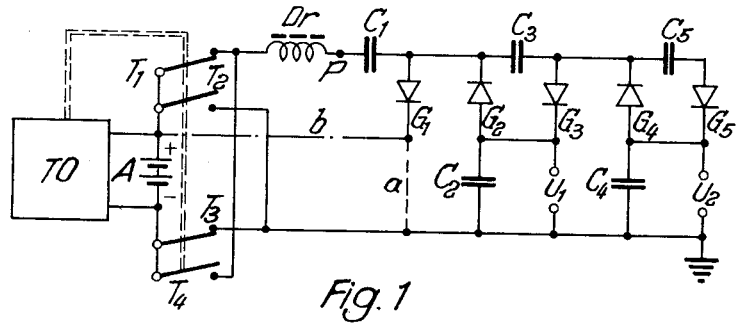
Figures 1 to 4 illustrate schematically circuit diagrams of several embodiments of the invention.
Figure 2:
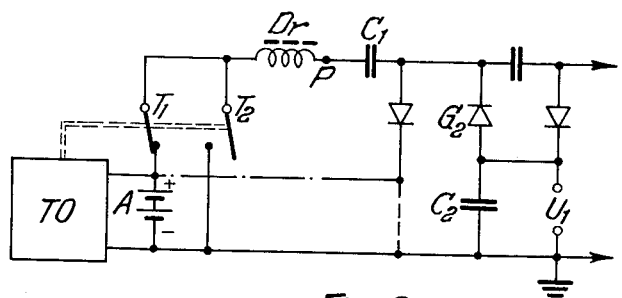
Figure 3:
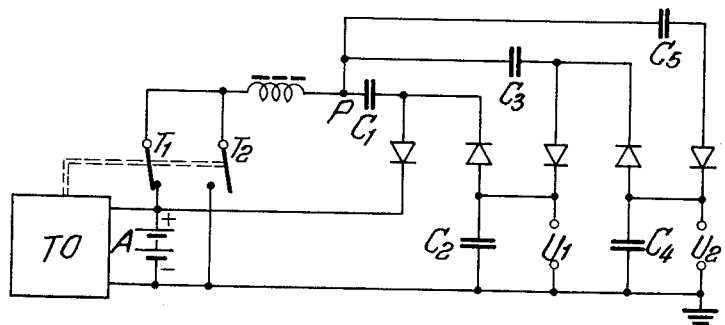
Figure 4:
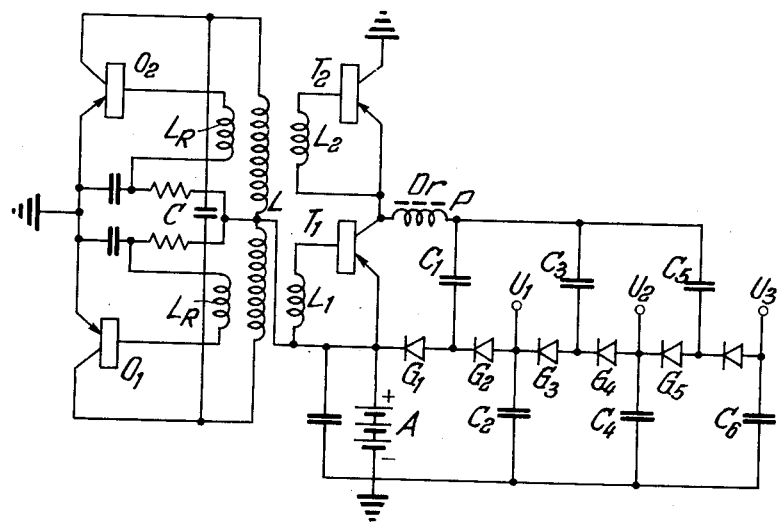

Referring now to Figures 1 to 3, of the drawings, the transistors illustrated in these embodiments of the invention act as switches denoted by $T_1$ to $T_4$. A transistor oscillator TO, fed from the same battery A as the transistor switches $T_1$ to $T_4$, controls the transistor switches in a manner not shown in this figure. Figure 4 is a complete circuit diagram corresponding to the simplified circuit shown in Figure 3.

In Figure 1, the switches $T_1$ to $T_4$ represent the collector side of the transistors. These transistors $T_1$ to $T_4$ cause a periodic reversal in the polarity of the battery A under the control of the transistor oscillator TO. The effect of the reactance coil $Dr$ will be hereinafter explained. The alternating voltage obtained by the reversal in polarity of the battery feeds the input P of a multiplier comprising rectifiers $G_1$ to $G_5$ and condensers $C_1$ to $C_5$ in a manner known per se. D.C. voltages $U_1$ or $U_2$ can be taken off from the multiplier as desired. If circuit connection $b$ is used in place of connection $a$, the voltage of the battery A is added to the voltage supplied from the multiplier. Any other known multiplier circuit may be used with the polarity reversing system according to Figure 1.

A different circuit arrangement is shown in Figure 2, in which only two switching transistors $T_1$ and $T_2$ are required. Actually, the D.C. voltage obtained in this instance is only half as high. However, this can be compensated in a simple manner by providing an additional duplication stage in the multiplier. In this circuit arrangement, the multiplier is periodically connected to the battery A via the transistor switch $T_1$. The transistor switch $T_2$ short-circuits the input of the multiplier during the interruption interval, so that the charge of the condenser $C_1$ is transmitted to the condenser $C_2$ via the rectifier $G_2$.

The circuit arrangement of Figure 3 differs from that shown in Figure 2 in that the condensers $C_1$, $C_3$ and $C_5$ are connected to a point P, rather than being connected in series. In such a circuit, the break-down voltages of the condensers in this figure have to be progressively increased, beginning with condenser $C_1$ and ending with condenser $C_5$. This is not necessary for the condensers in Figure 2, wherein the capacities have to be correspondingly increased, due to series-connecting of the condensers.

The complete circuit diagram, according to Figure 4 of the present invention, adds a further stage to the simplified circuit diagram of Figure 3. The transistor oscillator shown at the left side of Figure 4 comprises transistors $O_1$ and $O_2$. This transistor oscillator is adapted to oscillate, for example, at a frequency of 8 kilocycles. In this example, the oscillator operates in push-pull, because such oscillator delivers nearly a symmetrical alternating voltage. Feed-back coils LR are coupled with a coil L of an oscillation circuit LC. Furthermore, coils $L_1$ and $L_2$ are coupled with the coil L, said coils $L_1$ and $L_2$ controlling the transistors $T_1$ and $T_2$ at their inputs. The collector side of the transistor $T_1$ connects the upper terminal P of the multiplier with the positive terminal of the battery A via the reactance coil $Dr$ while, during alternate half-cycles of the control voltage, the collector side of the other transistor $T_2$, as shown in Figure 3, forms a periodic short-circuit at the input of the multiplier.

If, for example, a battery of 22.5 volts is used, voltages $U_1$ of 45 volts, $U_2$ of 67.5 volts and $U_3$ of 90 volts can be taken off. The condensers $C_1$ to $C_6$ have, for example, a capacity of $0.25\mu f$.

Figure 5:
Figure 5 shows a diagram of the curve of the alternating voltage obtained when the reactance coil mentioned in the foregoing is employed, the wave form without the coil being shown in dashed lines.

The diagram of Figure 5 illustrates the action of the reactance coil D$r$, shown in Figures 1 to 4, said coil having, for example, a value of 1.7 mh. The diagram shows the voltage U at the output of the transistor $T_1$ as a function of the time $t$ during one switching cycle. Without a reactance coil, the voltage at the input of the multiplier would increase and decrease according to the dashed line. As a result of the addition of the reactance coil, the curve shown in full line is obtained. Since the reactance coil decelerates the rate of current change, a current flow through the collector side of the switching transistors $T_1$ and $T_2$ is suppressed, until the transistors $T_1$ and $T_2$ have been rendered fully conductive in the circuit under the action of the control voltage at their bases and, therefore, the transistors have a low internal resistance. In this way, the current flowing through the transistors can cause only a minimum loss of energy in the transistors. At the start of the time when the transistors are rendered conductive by the A.C. control voltage, the condensers of the multiplier are already charged to such an extent, that the transistors carry only a low current and, experience only low energy losses. As a result of this, an approximate square-wave curve is obtained. It has been known from mechanical interrupters or vibrators and the above mentioned transistor oscillator, that the highest efficiency is obtained with a square wave.

I claim:

1. Apparatus for converting a D.C. voltage from a low-voltage source to a higher D.C. output voltage, comprising a low voltage source; a transistor oscillator connected with said low voltage source and generating an alternating voltage; a voltage multiplier having an input and having an output which constitutes the output of the apparatus, transistors acting as switches, each of said transistors having its conductivity controlled by a component of said alternating voltage and said switching transistors connecting the input of said multiplier with said voltage source to supply current of periodically reversing polarity to the multiplier, the reversing of the polarity being controlled by said alternating voltage, said multiplier comprising a network of condensers and rectifiers.

2. Apparatus according to claim 1, characterized in that the switching transistors comprise four transistors grouped and controlled in pairs of opposite conductivity.

3. Apparatus according to claim 1, characterized in that the switching transistors comprise two transistors connected on one side and in series with a condenser connected to one terminal of said multiplier input, and the voltage source being connected between the other sides of said transistors and to the other terminal of said input, said transistors alternately being rendered conductive and one transistor connecting the low-voltage source with the multiplier input and then the other transistor alternately short-circuiting the input of the multiplier during intervals when the first transistor becomes non-conductive and thus interrupts the connection of the battery with the multiplier.

4. Apparatus according to claim 1, characterized in that a reactance coil is inserted in series with one input terminal to the multiplier, the characteristics of said reactance coil being chosen in such a manner, that the current rise during the time when the switching transistors are becoming conductive is delayed in such a manner that a substantially square-wave form is present at the input of the multiplier between the transistors and the reactance coil.

5. Apparatus according to claim 1, for feeding said higher D.C. voltage to external electronic tube equipment, characterized in that the multiplier has more than two rectifiers, and different anode and grid voltages may be taken off from the individual stages of the multiplier without using resistance voltage dividers.

References Cited in the file of this patent

UNITED STATES PATENTS

| | | |
|---|---|---|
| 2,056,376 | Travis | Oct. 6, 1936 |
| 2,619,602 | Walker et al. | Nov. 25, 1952 |
| 2,773,200 | Guggi | Dec. 4, 1956 |
| 2,783,384 | Bright et al. | Feb. 26, 1957 |
| 2,817,803 | Hileman | Dec. 24, 1957 |